Figure 1:
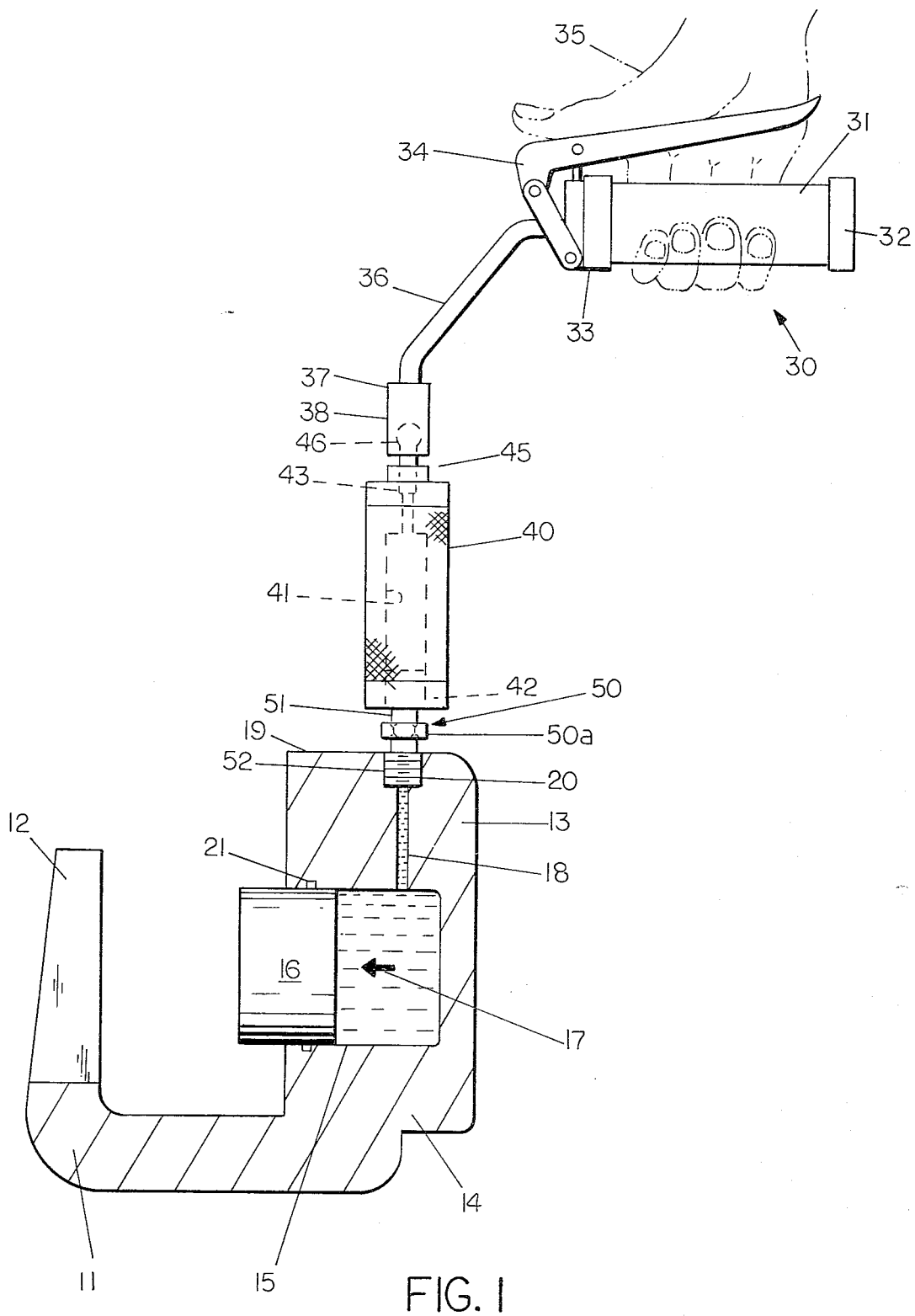

United States Patent [19]

Schroyer

[11] 4,240,191

[45] Dec. 23, 1980

[54] METHOD AND DEVICE FOR REMOVING DISC BRAKE PISTON

[76] Inventor: Robert F. Schroyer, 215 Poinsetta Ave., Toledo, Ohio 43612

[21] Appl. No.: 50,876

[22] Filed: Jun. 21, 1979

[51] Int. Cl.³ .............................................. B23P 19/02
[52] U.S. Cl. .................................... 29/426.5; 29/252; 29/156.5 R
[58] Field of Search ................... 29/426.5, 234, 426.1, 29/156.5 R, 252, 402.08; 188/72.5; 279/4, 2 A

[56] References Cited

U.S. PATENT DOCUMENTS

| | | | |
|---|---|---|---|
| 3,648,352 | 3/1972 | Simmonds | 29/156.5 R |
| 3,654,689 | 4/1972 | Schwarz | 29/156.5 R |
| 4,197,628 | 4/1980 | Conti et al. | 29/234 |

Primary Examiner—Milton S. Mehr
Attorney, Agent, or Firm—Paul F. Stutz

[57] ABSTRACT

Removal of automotive disc brake pistons, bound or seized within interior cylinder of caliper housing, is achieved through employment of hand or power grease gun via adaptor tool device, consisting of a small, hand-held, generally cylindrical hollow body, having at one end a removable fitting to fluidly engage the grease gun and the opposite end adapted to receive any one of a plurality of fittings, fluidly engageable with different threaded access ports in caliper housing.

3 Claims, 1 Drawing Figure

METHOD AND DEVICE FOR REMOVING DISC BRAKE PISTON

The present invention relates to a tool device. More particularly, the present invention relates to a tool device of utility in a removal of piston or pistons otherwise bound within the interior cylinder of opposed calipers or wheel cylinders, forming a part of automatic disc brakes.

As is well known, disc brakes feature one or more pistons actuated by hydraulic fluid to move toward each other, pressing brake pads onto opposed surfaces of a disc mounted on the axle of the vehicle. An increase in hydraulic pressure increases the pressure of the brake pads on the disc and slows the vehicle down. While efforts are made to protect the piston located within the cylinder from dust, dirt, water and the like, through the employment of dust boots, piston seals and, of course, the design of the caliper housing and its associated parts, it is nonetheless possible, unfortunately, for dirt and dust, as well as moisture, to get into the interior of the disc brake and particularly in the region of the caliper housing and, more significantly, the interior cylinder containing the piston. When this occurs, rusting may result and those servicing disc brakes frequently find the piston bound or "frozen" within the cylinder.

The removal of the bound or "frozen" piston presents a considerable problem to mechanics who frequently resort to the use of a hammer and sometimes to the employment of air pressure, through an access port, in the caliper housing to generate sufficient pressure and/or force as to expel the piston. The use of the hammer, of course, is usually damaging to the component parts of the brake and, of course, frequently damaging to the mechanic himself. The use of air is highly dangerous, since the conventional air pressure of 100 to 180 pounds per square inch, within the normal shop, is so great and uncontrolable that the piston is more often than not, uncontrolably, wildly and dangerously expelled with such force that damage to the piston or nearby equipment or personnel can occur. Both of these approaches are undesirable hazards to safety, to property and person. Mechanical devices have been used but are usually deficient in necessary force and known to damage the piston too frequently.

It has been proposed in U.S. Pat. No. 3,648,352 to design a rather complicated frame bearig a pump for feeding hydraulic fluid into the one end of the piston containing cylinder and generating a hydraulic or liquid pressure. The structure disclosed in this patent, however, is so cumbersome as to be impractical, expensive and, not least, not as safe as the present invention since the liquid will be expelled violently and suddenly when the piston breaks loose and passes beyond the cylinder. The same objection applies to the apparatus disclosed in U.S. Pat. No. 3,654,689.

In accordance with the present invention, I employ grease as the medium for affectig the removal of the bound or "frozen" piston although fluids of equivalent viscosity could be substituted.

It is further proposed that the grease, as available in hand-grease guns or power-grease guns is already available in most garages or shops. It is further proposed to provide an adaptor equipped with suitable fittings to engage the grease gun and replaceable fittings selected to accommodate the variety of access ports associated with particular caliper housings employed by the manufacturer of the disc brake for the particular vehicle.

It has been determined that the adaptor can be quite small, generally in the form of a hollow metal cylinder of approximately hand size and having a central bore leaving sufficient wall thickness to withstand the pressure. Each end of the bore is threaded. One end is threaded to accommodate a Zerk fitting as would be fluidly engagable with the Zerk fitting on the conventional grease gun. The other end of the bore has a threaded opening, engagable with any one of a plurality of hex fitments, having threads at each end. The thread at one end matches the threaded aperture in the handhold adaptor and the other threaded end of the fitment matches any one of the several standard threaded apertures in the caliper housings employed by disc brake manufacturers and employed or used by various automobile manufacturers.

It is also envisioned that the adaptor may have a plurality of apertures threadingly engaging a different threaded hex fitting, with appropriate stops or valves permitting grease flow only through one at a time.

The device or adaptor tool of the present invention is conveniently marketed as a kit consisting of the cylindrical body, having the central bore terminating at each end, in threaded female openings or ports, together with a plurality of fitments. Several of the fitments would contain threaded ends matching the threads in the female apertures in one end of the cylindrical body while the other end would contain a particular size or design of a Zerk fitting. Additionally, several fitments will feature one end engagable with the threaded aperture of the cylindrical adaptor and the other ends each being of varying preselected thread design, eg. threads per inch and diameter to match the several threaded apertures in standard caliper housings. The fitment is also appropriately marked with the specifications so that the one using the assembly of parts, marketed in a blister pack or in a cloth bag or in a box, can select the appropriate fitments to accomodate the threaded aperture in the caliper housing.

It is, accordingly, an object of the present invention to provide a practical solution to the problem of bound or seized pistons, otherwise resistant to release from the cylinders within the caliper housing of automotive disc brakes.

It is a particular object of the present invention to provide an adaptor tool device of simple design and, accordingly, low cost which serves to temporarily connect, in fluid sealed relationship, a conventional hand or pressure grease gun and the aperture in the caliper housing of a disc brake which fluidly communicates with the interior of the cylinder to allow transmission of an appropriate amount of grease under controllable operator-determined pressure to the cylinder as will be just sufficient to fill the cylinder void and expel the bound or seized piston from the cylinder without wild and dangerous expelling of the piston.

It is a further object of the present invention to provide a mutually cooperative plurality of parts which, when properly assembled, provide the adaptor tool of the present invention in a form as will accommodate any one of a variety of caliper housings with its included aperture as employed in a variety of automotive disc brakes.

The foregoing and, as well, other objects of the present invention will become apparent to those skilled in the art from the following detailed description taken in conjunction with the annexed sheet of drawings on which there is illustrated schematically a singular embodiment of the present invention.

IN THE DRAWINGS

FIG. 1 is a partially schematic side elevation view, with parts broken away, of a caliper housing of a disc brake having threadingly engaged therewith an adaptor of the present invention.

Most simply, the present invention comprises a relatively small cylinder having a central bore terminating at one end in a threaded aperture adapted to receive a threaded hex fitment, featuring at one end a Zerk connector and at the other end of the bore a threaded opening, threadingly receivable of any one of a plurality of hex fitments, each having at the outer male end any one of a series of preselected diameters and thread pitch, permitting a match with any one of the known threaded apertures in various caliper housings employed in particular disc brakes.

Reference may now be had to FIG. 1 wherein is disclosed a U-shaped caliper housing 11 having a smaller leg segment 12 and a connected larger spaced segment 13 having a thicker body section 14 containing an interior cylinder 15 receivable of a cylindrical piston 16 reciprocably slideable within the cylinder as indicated by the arrow 17. The reference numeral 21 indentifies a recess for a circular piston seal, not shown. Similarly, dust boots and the like are not shown in the interest of clarity. Suffice it to say that moisture, dust and other foreign materials frequently gets beyond the seals into the cylinder 15 and between the cylinder wall and the piston 16. As a result, the piston becomes seized or bound within the wall of the cylinder blocking mechanical repair, servicing, lubrication, replacement of sealed parts, etc. The heavier body portion 14 contains an interior passageway 18 extending from the cylinder 15 to an outer surface 19 and there terminating in a threaded aperture 20.

In accordance with the present invention, it is proposed to employ a hand-held grease gun such as represented schematically and identified in the drawings by the reference numeral 30. The grease gun 30 includes a hollow cylindrical body reservoir 31, a removable threaded cap 32 providing access for loadig the cylinder with grease and having at the other end a threaded head member 33 inclusive of a hand pump 34, actuated by the palm of the hand 35 (shown in dotted outline) and an exit nozzle 36 having a threaded end 37 receivable of a female Zerk fitment 38. The hand-held grease gun 30, nozzle 36 and fitment 38, as described, are generally found in the average garage or shop since many components on the underside of automobiles and trucks, for example, require lubrication. These components are usually provided with a male Zerk fitting to which the grease gun and matching female Zerk fitting can be connected in quick, convenient fashion to yield a fluid-sealed connection, allowing hand pumping of the device such as 30 to propel grease through the matching Zerk fittings to the interior of the component, bearing or the like, requiring the lubrication. In place of hand-held guns, many garages feature a pressure grease gun actuated by a suitable trigger or lever.

In accordance with the present invention, there is additionally provided a tool or adaptor device which permits the grease, under fluid pressure as actuated by a hand pump 34 or by a pressure pump as found in many garages (not shown), to be transmitted to the interior cylinder 15 of the caliper housing. The adaptor, as shown in the drawings, consists of an approximately three inch (3") length of five eights (⅝") inch steel pipe, identified by the reference numeral 40. The adaptor contains a central hollow bore 41, terminating at one end in a threaded region 42 and at the other end in a threaded region 43. The threaded region 43 is of appropriate diameter and thread pitch to receive a standard male Zerk one-eighth inch (⅛") fitting 45 having terminal end 46 adapted to fluidly engage the matching standard Zerk fitting 38 at the end of the nozzle 36 extending from the hand pressure gun 30. The threaded region 42 at the other end receives a hex fitment 50, having at one end threads 51 matching the threads at 42 and at the other end threads 52 matching the threads 20 in the caliper housing. The hex fitment 50 includes an integral hexagonal connector nut 50a for wrench securement, both into the body 40 and into the aperture 20 of the caliper housing. Similarly, fitting 45 includes a hexagonal segment for engagement by a suitable wrench.

In accordance with the present invention, the hex fitment 50 will be available in several different sizes in terms of the male threads, both pitch and diameter. For disc brakes employed in United States manufactured automobiles, three sizes will provide essentially one hundred percent matching of the aperture in the caliper housing. The three sizes are: (1.) seven-sixteenth inch (7/16") diameter by twenty four (24) pitch; (2.) seven sixteenth inch (7/16") diameter by 20 pitch and (3.) three-eights inch (⅜") diameter by 24 pitch. The hex fitment 50 is desirably made of brass or bronze.

Desirably, the adaptor tool or device of the present invention is desirably marketed as a kit or packaged assembly of the necessary matching component parts as will allow selection of the proper parts, particularly of the fitments and proper connection of the parts in a manner as will provide adaptability for the particular grease gun source of the grease to be employed and the aperture in the caliper housing of the particular disc brake carried by the automobile being serviced. As indicated, usually three hex fitments, featuring preselected variant thread design will suffice to match the caliper housing employed in United States manufactured disc brakes. The kit will, desirably and additionally, include a preselected plurality, usually two to four, of fitments featuring a threaded male end for threading engagement with caliper housing apertures of disc brakes employed in European made cars and accordingly, featuring a metric dimensioned thread design. The hex fitments are preferably inscribed with the appropriate thread diameter and pitch, either in the inches of the United States system or the metric system, to assist in the selection and connection of the proper parts. Generally, the hex nut configuration can be fabricated as to represent a compromise between inches and millimeters so as to accommodate end wrenches of either system. The body of adaptor 40, the fitting 50 and the fitting 45 must desirably have a knurled exterior surface to provide a most convenient hand or finger gripping feature. This allows simple hand tightening of the recited elements 50, 40 and 45 into the threaded aperture 20 of the caliper housing 13. The hand tightening is found usually to be sufficient and provides a convenient aspect of the employment of the adaptor tool, as described, for its intended purpose. It is also possible to provide, as an option, for the elements 50, 40 and 45 to have flattened opposed surfaces in addition to knurled regions so that a wrench may be employed under certain conditions.

Employment of the adaptor tool of the present invention has been found to be very convenient and in fact, a marked improvement in terms of ease of performance as well as in safety and most importantly, in terms of positive, reliable loosening of the piston and gradual movement thereof out of the cylinder under the pressure of the grease.

The use of hammer, as referred to earlier herein, of course, is obviously undesirable, impractical and simply not representative of proper workmanship. The use of air pressure, while in haste considered expedient, is in a practical sense a poor and, in fact, dangerous technique. Most available air compressors around the usual garage or shop are set at a predetermined pressure in the neighborhood of 100 to 180 pounds per square inch. The impressment of this air pressure, into the aperture and passageway leading to the cylinder housing the seized piston, will occassionally serve to dislodge or free the piston. However, the control of the air pressure is so random and unpredictable that the piston is expelled suddenly, unexpectedly and with violent force, leading to a very unsafe condition as well as a condition leading to damage of the components and as well, other equipment within the vicinity.

In accordance with the further embodiment of the present invention, the body need not be cylindrical and would, desirably, include a plurality of threaded apertures communicating fluidly with the interior bore. Each of the threaded apertures would have threadingly secured therein a different hex fitment featuring a different thread pitch and diameter for securement with any one of the known, threaded apertures associated with a given brake caliper housing. Interiorly, of course, the body includes a slide stop or plug, movable to block flow of grease to all but the hex fitment desired for the aperture size of the disc brake caliper housing being serviced and experiencing the bound or seized piston.

Other obvious modifications 'and changes will be suggested by the within disclosure to those reasonably and normally skilled in the art to which the present invention pertains and accordingly, all such obvious modification, changes, substitutions or equivalents are intended to be included within the scope of the present invention unless such would be violative of the language of the appended claims.

I claim:

1. A method of removing a piston stuck in its cylinder located in a disc brake caliper which comprises impressing or introducing grease, under pressure, to an existing port in said caliper which, through a passageway, leads to the interior of said cylinder and continuing said introduction of grease until the passageway and interior of said cylinder are filled with grease whereupon continued introduction and/or increased pressure of said grease causes said piston to be slowly, safely and controllably expelled from said cylinder.

2. Device for removing a disc brake piston immovably seized within its normally slidably surrounding cylinder, said cylinder being located in the caliper housing of the disc brake, said housing having an internally formed passageway or conduit leading from or connecting said cylinder to a threaded aperture in an outer surface of said caliper, said device comprising (1) a principal body having two spaced and threaded surface ports, fluidly connected by an interior bore, (2) a Zerk fitting threadingly received by one of said ports, said Zerk fitting being preselected to match a Zerk fitting on the terminal end of a conduit leading to a supply-controlled source of grease, and (3) any one of a plurality of preselected fitments threadingly received by the other of said ports, said fitment including a threaded end matching the threaded aperture in the surface of said caliper, said body bore, Zerk fitting, and preselected fitment defining a conduit for grease controllably expelled from a given source to pass therethrough to said passageway in said caliper and thence under pressure to said cylinder to fill said cylinder void or chamber and slowly and inexorably expel said piston.

3. The combination which includes the device of claim 2 and hand-held grease gun featuring a hand pump control for controllably and incrementally urging grease under pressure into the cylinder for slow and safe expelling of the piston.

* * * * *